(12) United States Patent
Feng

(10) Patent No.: US 7,370,270 B2
(45) Date of Patent: May 6, 2008

(54) XML SCHEMA EVOLUTION

(75) Inventor: An Feng, Cupertino, CA (US)

(73) Assignee: AOL LLC a Delaware limited liability company, Dulles, VA (US)

( * ) Notice: Subject to any disclaimer, the term of this patent is extended or adjusted under 35 U.S.C. 154(b) by 857 days.

(21) Appl. No.: 10/279,481

(22) Filed: Oct. 23, 2002

(65) Prior Publication Data

US 2004/0083218 A1  Apr. 29, 2004

(51) Int. Cl.
*G06N 3/00* (2006.01)
(52) U.S. Cl. .................................................. 715/234
(58) Field of Classification Search ................ 715/513, 715/517, 523, 530
See application file for complete search history.

(56) References Cited

U.S. PATENT DOCUMENTS

| | | | |
|---|---|---|---|
| 5,889,863 A | 3/1999 | Weber | 705/76 |
| 5,960,200 A | 9/1999 | Eager et al. | 717/147 |
| 6,085,198 A | 7/2000 | Skinner et al. | 707/103 R |
| 6,199,195 B1 | 3/2001 | Goodwin et al. | 717/104 |
| 6,256,773 B1 | 7/2001 | Bowman-Amuah | 717/121 |
| 6,279,006 B1 | 8/2001 | Shigemi et al. | 707/101 |
| 6,289,382 B1 | 9/2001 | Bowman-Amuah | 709/226 |
| 6,301,575 B1 | 10/2001 | Chadha et al. | 707/2 |
| 6,324,647 B1 | 11/2001 | Bowman-Amuah | 713/201 |
| 6,332,163 B1 | 12/2001 | Bowman-Amuah | 709/231 |
| 6,339,832 B1 | 1/2002 | Bowman-Amuah | 714/35 |
| 6,370,573 B1 | 4/2002 | Bowman-Amuah | 709/223 |
| 6,385,604 B1 | 5/2002 | Bakalash et al. | 707/3 |
| 6,405,364 B1 | 6/2002 | Bowman-Amuah | 717/101 |
| 6,418,448 B1 * | 7/2002 | Sarkar | 707/104.1 |
| 6,742,001 B2 * | 5/2004 | Ripley | 707/104.1 |
| 6,917,935 B2 * | 7/2005 | Zwiegincew et al. | 707/4 |
| 2002/0147645 A1 * | 10/2002 | Alao et al. | 705/14 |
| 2003/0084054 A1 * | 5/2003 | Clewis et al. | 707/100 |
| 2003/0167445 A1 * | 9/2003 | Su et al. | 715/513 |

FOREIGN PATENT DOCUMENTS

| | | |
|---|---|---|
| EP | 1 126 681 | 8/2001 |
| EP | 1 217 551 | 6/2002 |

OTHER PUBLICATIONS

*Challenge of XML Schemas—Schema Evolution*—Roger L. Costello and John C. Schneider; May 29, 2000; The MITRE Corp.
*Representing Product Family Architectures in an Extensible Architecture Description Language*—Eric M. Dashofy and Andre van der Hoek.
*Modify XML Schemas in .NET: Use classes Within the System.Xml. Schema namespace to create and modify schemas*—Dan Whalin; May 6, 2002.
*Features Overview*; Microsoft .net Framework; http://msdn.microsfot.com/netframework/productinfo/features.asp.
*W3QS-A System for WWW Querying*—D. Konopnicki, and O. Shmueli; 13th International Conference on Data Engineering; Apr. 7-11, 1997.

* cited by examiner

*Primary Examiner*—Stephen Hong
*Assistant Examiner*—Kyle R Stork
(74) *Attorney, Agent, or Firm*—Michael A. Glenn; Glenn Patent Group

(57) ABSTRACT

A technique for evolving XML schemas is disclosed. The technique involves methods for performing schema manipulating operations and for validating the schema changes so that the current XML documents remain valid against the new schema.

18 Claims, 5 Drawing Sheets

XML SCHEMA EVOLUTION

BACKGROUND OF THE INVENTION

1. Technical Field

The invention relates generally to XML schema evolution technique. More particularly, the invention relates to an apparatus and a method for providing schema manipulation operations and validating schema changes.

2. Description of the Prior Art

XML (Extensible Markup Language), developed by the World Wide Web Consortium (W3C), is a system for organizing and tagging elements of a document. It allows designers to create their own customized tags, enabling the definition, transmission, validation, and interpretation of data between applications and between organizations. It is a flexible way to create common information formats and share both the format and the data on the World Wide Web, intranets, and other networks. For example, computer makers might agree on a standard way to describe information, such as processor speed, memory size, and so forth, about a computer product and then describe the product information format with XML. Such a standard way of describing data enables a user to send an intelligent agent to each computer maker's Web site, gather data, and then make a valid comparison. XML can be used by any individual or group of individuals or company that wants to share information in a consistent way.

XML elements and attributes can be identified and accessed with XPath expressions. XPath is a language that describes a way to locate and process items in XML documents by using an addressing syntax based on a path through the document's logical structure or hierarchy. This makes writing programming expressions easier than if each expression had to understand typical XML markup and its sequence in a document. XPath also allows the programmer to deal with the document at a higher level of abstraction. It uses the information abstraction defined in the XML Information Set.

XPath uses the concepts of node, i.e. the point from which the path address begins), the logical tree that is inherent in any XML document, and the concepts expressing logical relationships that are defined in the XML Information Set, such as ancestor, attribute, child, parent, and self. XPath includes a small set of expressions for specifying mathematics functions and the ability to be extended with other functions.

The XML language itself does not limit set of tags for element and attribute names. Due to lack of a definite set of element and attribute names and lack of structure definition, confusion may arise when two different party communicate via XML documents. This has lead to the provision of many schema definition languages, one of which is the XML Schema that specifies how to describe the elements in XML document formally. This description can be used to verify that each item of content in a document adheres to the description of the element in which the content is to be placed.

In general, a schema is an abstract representation of an object's characteristics and relationship to other objects. An XML schema represents the interrelationship between the attributes and elements of an XML object, for example, a document or a portion of a document. To create a schema for a document, its structure must be analyzed and each structural element must be defined. XML Schema has several advantages over earlier XML schema languages, such as Document Type Definition (DTD). For example, it is more direct: XML Schema, in contrast to the earlier languages, is written in XML, which means that it does not require intermediary processing by a parser. Other benefits include self-documentation, automatic schema creation, and the ability to be queried through XML Transformations (XSLT).

For an XML schema to endure over time it must be capable of evolving to reflect the changing information requirements. A set of operations, such as, Insert, Delete, Update, Query has been proposed for manipulating XML documents. However, no mechanisms have been defined for manipulating XML schemas.

To allow XML document to contain extended data, XML schemas could have various data types with <xsd:any> as its subcomponents. <xsd:any> are served as place holders for any extended data because an any type does not constrain its content in any way. An extremely extensive XML schema is illustrated as follows:

```
<xs:element name="myData">
    <xs:complexType><xs:sequence>
        <xs:any processContents="skip" minOccurs="0" maxOccurs="unbounded"/>
    </xs:sequence></xs:complexType>
</xs:element>
```

Although this approach does allow extended data to be contained in XML documents of the schema, it does not provide any control of the extended data.

What is desired is a technique for performing schema manipulation operations so that an XML schema can be evolved in a controlled, pragmatic way. Because there might be lots of XML documents, e.g. thousands under an existing XML Schema, XML Schema must evolve in such a way that ensures all existing XML documents remain valid under the new XML schema that results from such schema manipulations.

What is further desired is a technique to determine whether all XML documents are still valid after schema manipulation without individually examining these XML documents. It is time consuming to examine thousands XML documents. In certain applications, for example Web Services that use XML to represent user data logically in a distributed set of computers, it is substantially impossible to examine XML documents individually.

SUMMARY OF THE INVENTION

A technique to evolve XML schemas is disclosed. The technique involves methods of performing schema manipulation operations and validating the schema changes so that the current XML documents remain valid against the new schema. A method to compare two XML document sets, each containing all valid XML documents of one schema, is disclosed that avoids the need to validate all current XML documents with the new XML schema.

According to one aspect of the invention, a method for evolving a first XML schema to a second XML schema in an application involving a plurality XML documents which are valid against the first XML schema comprises the steps of: (1) performing a plurality of schema manipulation operations to generate the second XML schema; and (2) validating the plurality of schema manipulation operations so that all existing XML documents are still valid.

Another aspect of the invention provides a method for determining whether a first set of XML documents contains a second set of XML documents. The first set of XML documents is the set of all valid XML documents of a first XML schema and the second set of XML documents is the set of all valid XML documents of a second XML schema. This method comprises the steps of: (1) locating a first root element for the first XML schema and a second root node for the second schema; (2) constructing a first element set which contains elements that could be reached from the first root node and a second element set which contains elements that could be reached from the second root node; (3) returning false if the first element set does not contain the second element set; and (4) performing element comparison for each of the elements in the second element set with the corresponding elements in the first element set.

In yet another aspect of the invention, an apparatus for evolving XML schemas in an application handling XML documents comprises a schema manipulation means, and a schema validation means, wherein the schema manipulation means performs a plurality of schema manipulation operations to evolve a current XML schema into a new XML schema, and wherein the schema validation means validates the new XML schema to make sure all current XML documents are still valid against the new XML schema.

DETAILED DESCRIPTION OF THE INVENTION

In the following detailed description of the invention, some specific details are set forth to provide a thorough understanding of the presently preferred embodiment of the invention. However, it will be apparent to those skilled in the art that the invention may be practiced in embodiments that do not use the specific details set forth herein. Well known methods, procedures, components, and circuitry have not been described in detail.

In one preferred embodiment of the invention, a method is disclosed for evolving a first XML schema to a second XML schema in an application involving a plurality XML documents which are valid against the first XML schema. The method comprises the following steps:

performing a plurality of schema manipulation operations to generate the second XML schema; and validating the plurality of schema manipulation operations so that all existing XML documents are still valid.

Figure 1:
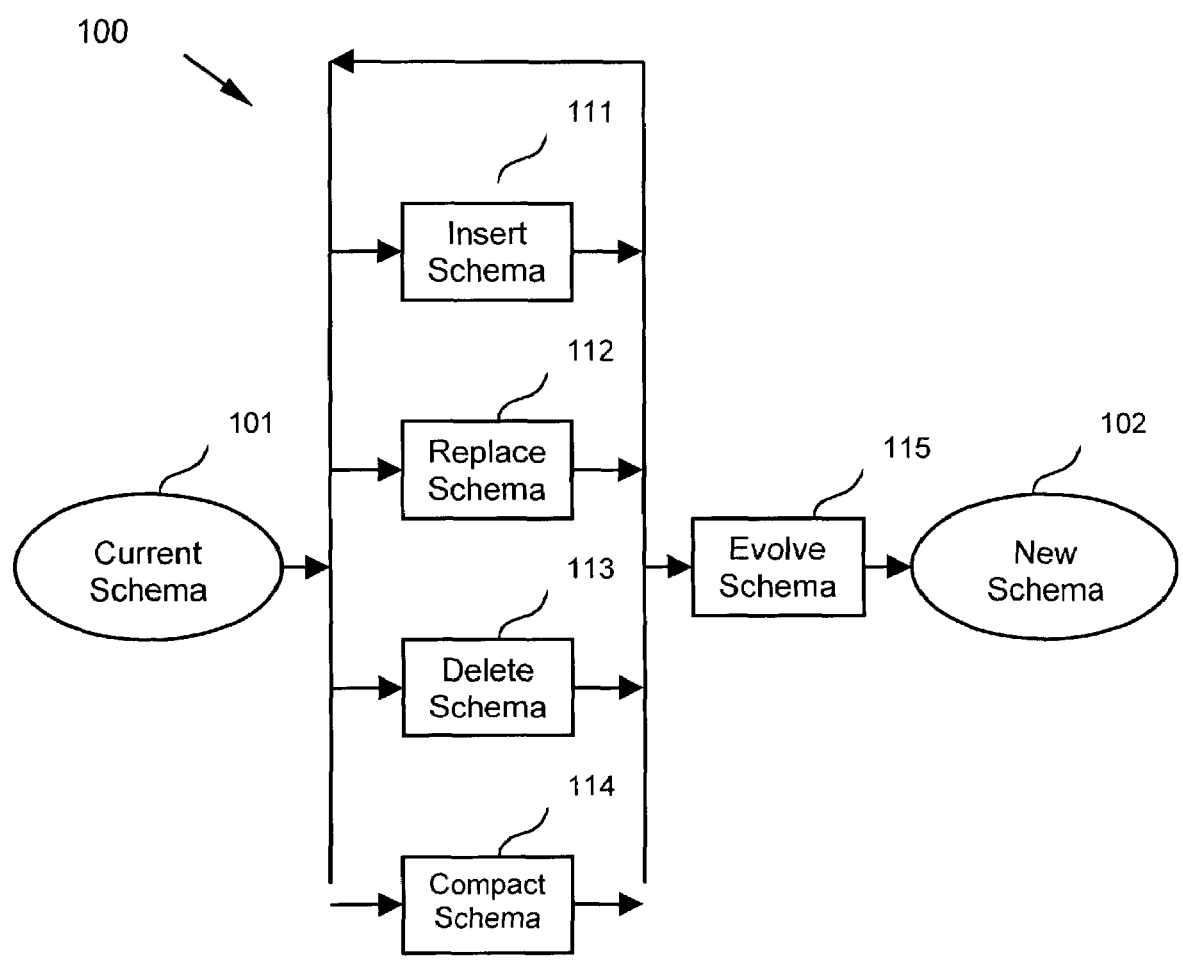
FIG. 1 is a schematic diagram illustrating schema manipulation operations according to the invention.

FIG. 1 is a schematic diagram illustrating a list of schema manipulation operations 100. The schema manipulation operations, which may be invoked on the current XML schema 101 to obtain a new XML schema 102, include an insert schema operation 111, a replace schema operation 112, a delete schema operation 113, a compact schema operation 114, and an evolve schema 115.

The insert schema operation 111 inserts a schema segment into an XML schema.

The syntax for the insert schema operation is as the following:

InsertSchema <schema ID> <XPath to locate a component> <relative position> <new XML segment to be added>

The detail descriptions of parameters are listed in Table 1 below.

TABLE 1

| Parameters | Description | Example |
| --- | --- | --- |
| schema ID | A unique string that identifies a schema | <schemaID>Address.xsd</schemaID> |
| XPath to locate a component | an XPath expression that identify a node in an XML schema. Examples of such a node include <schema>, <element>, <complexType>, <attribute>, and <sequence> etc . . . | <xpath>/element [@name="address"]</xpath> |
| relative position | The relative position w.r.t. a selected XML schema node. It could take one of four values: before . . . as the immediately left sibling (before) the selected node after . . . as immediately right sibling (after) the | <position>after</position> |

TABLE 1-continued

| Parameters | Description | Example |
|---|---|---|
| | selected node first_child . . . as the first child of the selected node last_child . . . as the last child of the selected child | |
| new XML segment to be added | One or several XML schema nodes | ```
<newSegment>
  <xs:complexType
name="simpleAddressType">
    <xs:sequence>
      <xs:element name="street"
type="xs:string" maxOccurs="3"/>
      <xs:element name="city"
type="xs:string"/>
    </xs:sequence>
    <xs:attribute name="country"
type="xs:string"/>
  </xs:complexType>
</newSegment>
``` |

This operation can also be represented in XML. The following is an XML sample which represents an insert schema operation:

```
<InsertSchema>
    <schemaID>Address.xsd</schemaID>
    <xpath>/element[@name="address"]</xpath>
    <position>after</position>
    <newSegment>
        <xs:complexType name="simpleAddressType">
            <xs:sequence>
                <xs:element name="street" type=
                "xs:string" maxOccurs="3"/>
                <xs:element name="city" type=
                "xs:string"/>
            </xs:sequence>
            <xs:attribute name="country" type=
            "xs:string"/>
        </xs:complexType>
    </newSegment>
</InsertSchema>
```

The replace schema operation 112 replaces a schema segment of an XML schema. The syntax for the replace schema operation is as the following:

ReplaceSchema <schema ID> <XPath to locate a component> <new XML segments used for replacement>

The detail descriptions of parameters are listed in Table 2.

TABLE 2

| Parameters | Description | Example |
|---|---|---|
| schema ID | A unique string that identifies a schema | <schemaID>Address.xsd</schemaID> |
| XPath to locate a component | an XPath expression that identify a node in an XML schema. Examples of such a node include <schema>, <element>, <complexType>, <attribute>, and <sequence> etc . . . | <xpath>/complexType [@name="addressType"]</xpath> |

TABLE 2-continued

| Parameters | Description | Example |
|---|---|---|
| new XML segments used for replacement | One or several XML schema nodes | ```
<newSegment>
    <xs:complexType name="addressType">
        <xs:complexContent>
            <xs:extension base="simpleAddressType">
                <xs:sequence>
                    <xs:element name="state" type="xs:string"/>
                    <xs:element name="zipcode" type="xs:string"/>
                </xs:sequence>
            </xs:extension>
        </xs:complexContent>
    </xs:complexType>
</newSegment>
``` |

This operation can also be represented in XML. The following is an XML sample which represents a replace schema operation:

```
<ReplaceSchema>
    <schemaID>Address.xsd</schemaID>
    <xpath>/complexType[@name="addressType"]</xpath>
    <newSegment>
        <xs:complexType name="addressType">
            <xs:complexContent>
                <xs:extension base="simpleAddressType">
                    <xs:sequence>
                        <xs:element name="state" type="xs:string"/>
                        <xs:element name="zipcode" type="xs:string"/>
                    </xs:sequence>
                </xs:extension>
            </xs:complexContent>
        </xs:complexType>
    </newSegment>
</ReplaceSchema>
```

The delete schema operation 113 deletes a schema segment from an XML schema.

The syntax for the delete schema operation is as the following:

DeleteSchema <schema ID> <Xpath to locate a component>

The detail descriptions of parameters are listed in the following Table 3.

TABLE 3

| Parameters | Description | Example |
|---|---|---|
| schema ID | A unique string that identifies a schema | <schemaID>Address.xsd</schemaID> |
| XPath to locate a component | an XPath expression that identify a node in an XML schema. Examples of such a node include <schema>, <element>, <complexType>, <attribute>, and <sequence> etc . . . | <xpath>/element [@name="address"]</xpath> |

This operation can also be represented in XML. The following is an XML sample which represents a delete schema operation. The sample operation eliminates an element "country."

```
<DeleteSchema>
    <schemaID>Address.xsd</schemaID>
    <xpath>/complexType/sequence/element[@name=
      "country"]/</xpath>
</DeleteSchema>
```

The compact schema operation 114 makes an XML schema compact by eliminating unnecessary segments. The syntax for a compact schema operation is as the following:

CompactSchema <schema ID> <XPath to locate a component>

The detail descriptions of parameters are listed in the following Table 4.

TABLE 4

| Parameters | Description | Example |
|---|---|---|
| schema ID | A unique string that identifies a schema | <schemaID>Address.xsd</schemaID> |
| XPath to locate a component | an XPath expression that identify a node in an XML schema. Examples of such a node include <schema>, <element>, <complexType>, <attribute>, and <sequence> etc . . . | <xpath>/element [@name="address"]</xpath> |

This operation can also be represented in XML. The following is an XML sample which represents an insert schema operation. This operation sample makes the type definition of "addressType" more compact.

```
<CompactSchema>
    <schemaID>Address.xsd</schemaID>
    <xpath>/complexType[@name="addressType"]/sequence</xpath>
</CompactSchema>
```

The evolve schema 115 operation commits the schema changes since a previous version. The syntax for the evolve schema operation is as the following:

EvoloveSchema <schema ID> <new_version>

The detail descriptions of parameters are listed in the following Table 5.

TABLE 5

| Parameters | Description | Example |
|---|---|---|
| schema ID | A unique string that identifies a schema | <schemaID>Address.xsd</schemaID> |
| new version | New version assigned to the evolved schema | <newVersion>2.0</newVersion> |

This operation can also be represented in XML. The following is an XML sample which represents an evolve schema operation:

```
<EvoloveSchema>
    <schemaID>Address.xsd</schemaID>
    <newVersion>2.0</newVersion>
</EvoloveSchema>
```

When an evolve schema operation is performed, the result new schema is validated.

To validate a schema evolution from the current XML schema to new XML schema, a first set of all valid XML documents of the current XML schema is compared with a second set of all valid XML documents of the new XML schema. If the second set of XML documents contains the first set of XML documents, all current XML documents remain valid against the new XML schema, and the schema evolution is valid.

Figure 2:
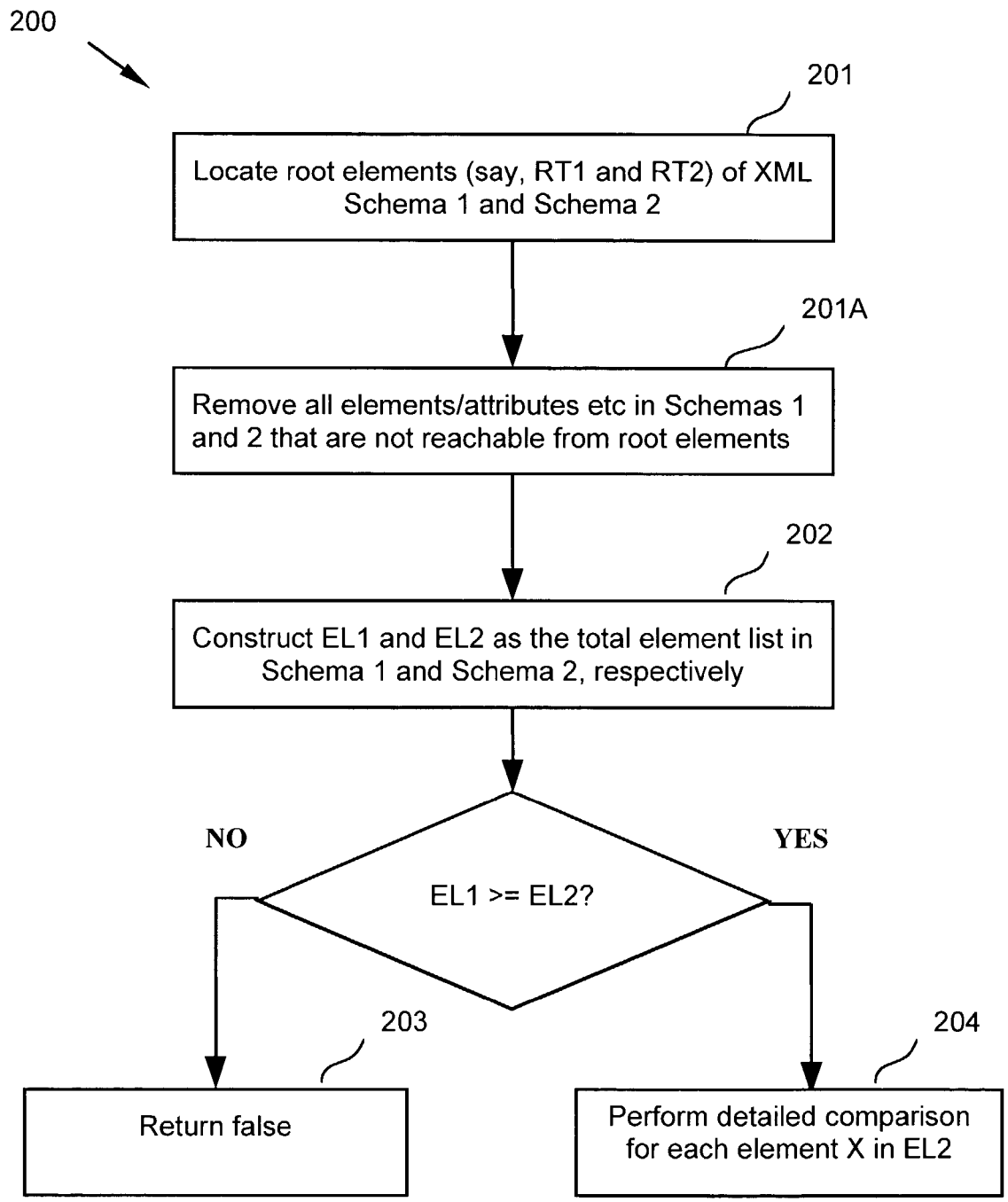
FIG. 2 is a flow diagram illustrating a method for determining whether a first set of XML documents contains a second set of XML documents.

FIG. 2 is a flow diagram illustrating a method 200 for determining whether a first set of XML documents contains a second set of XML documents in another equally preferred embodiment of the invention. Here, the first set of XML documents is the set of all valid XML documents of a first XML schema and the second set of XML documents is the set of all valid XML documents of a second XML schema. The method 200 comprises the following steps:

Step 201: Locate a first root element (RT1) for the first XML schema and a second root node (RT2) for the second schema;

Step 201A: Remove all elements and attributes from the first XML schemas that are not reachable from the first root element RT1 and from the second XML schema that are not reachable from the second root element RT2;

Step 202: Construct a first total element list (EL1) in the first XML schema and a second total element list (EL2) in the second XML schema;

Step 203: Return false if the first element list (EL1) does not contain the second element list (EL2); and Step 204: Perform detailed element comparison for each of the elements in the second element list (EL2) with the corresponding elements in the first element list (EL1).

Figure 3:
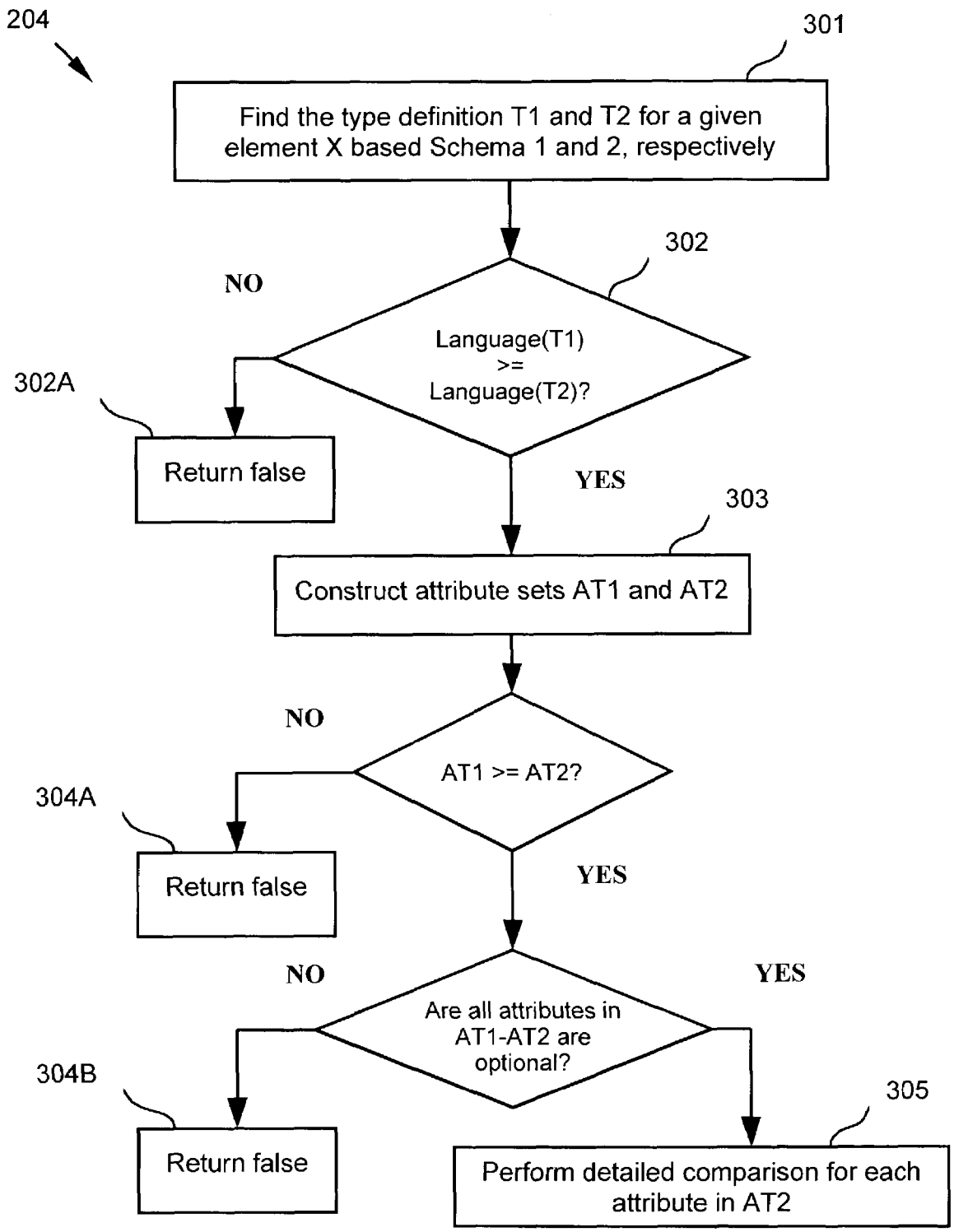
FIG. 3 is a flow diagram illustrating the details of the element comparison step of the method of FIG. 2.

FIG. 3 is a flow diagram illustrating the sub-steps of the element comparison step 204 of the method 200:

Step 301: Find a first type definition (T1) of a first element in the first XML schema and a second type definition (T2) of a second element in the second XML schema;

Step 302: Perform comparison of a first language set, L(T1), which represents all possible values covered by the first type definition and a second language set, L(T2), which represents all possible values covered by the second document type;

Note that data type definitions may need to be flattened to obtain these regular expressions. For example, the regular expression of the following "address" are "(street street? street? city state zipcode)".

```
<element name="address" type="USAddressType">
<complexType name="simpleAddressType">
    <sequence>
        <element name="street" type="string" maxOccurs="3">
        <element name="city" type="string">
    </sequence>
    <attribute name="country" type="string">
</complexType>
<complexType name="addressType">
    <complexContent>
        <extension base="USAddressType">
            <sequence>
                <element name="state" type="xs:string"/>
                <element name="zipcode" type="xs:string"/>
            </sequence>
            <attribute name="version" type= "integer">
        </extension>
    </complexContent>
</complexType>
```

Step 302A: Return false if the first language set L(T1) does not contain the second language set L(T2);

Step 303: Construct a first attribute set (AT1) associated with the first element and a second attribute set (AT2) associated with the second element;

Note that data type definitions may need to be flattened to obtain these lists. For the above example, the attribute set for "address" is {"country", "version"}.

Step 304A: Return false if the first attribute set (AT1) does not contain the second attribute set (AT2);

Step 304B: Return false if any attribute in the first attribute set (AT1) but not in the second attribute set (AT2) is required;

Step 305: Perform detailed attribute comparison for each of the attributes in the second attribute set (AT2) with the corresponding attributes in the first attribute set (AT1).

Figure 4:
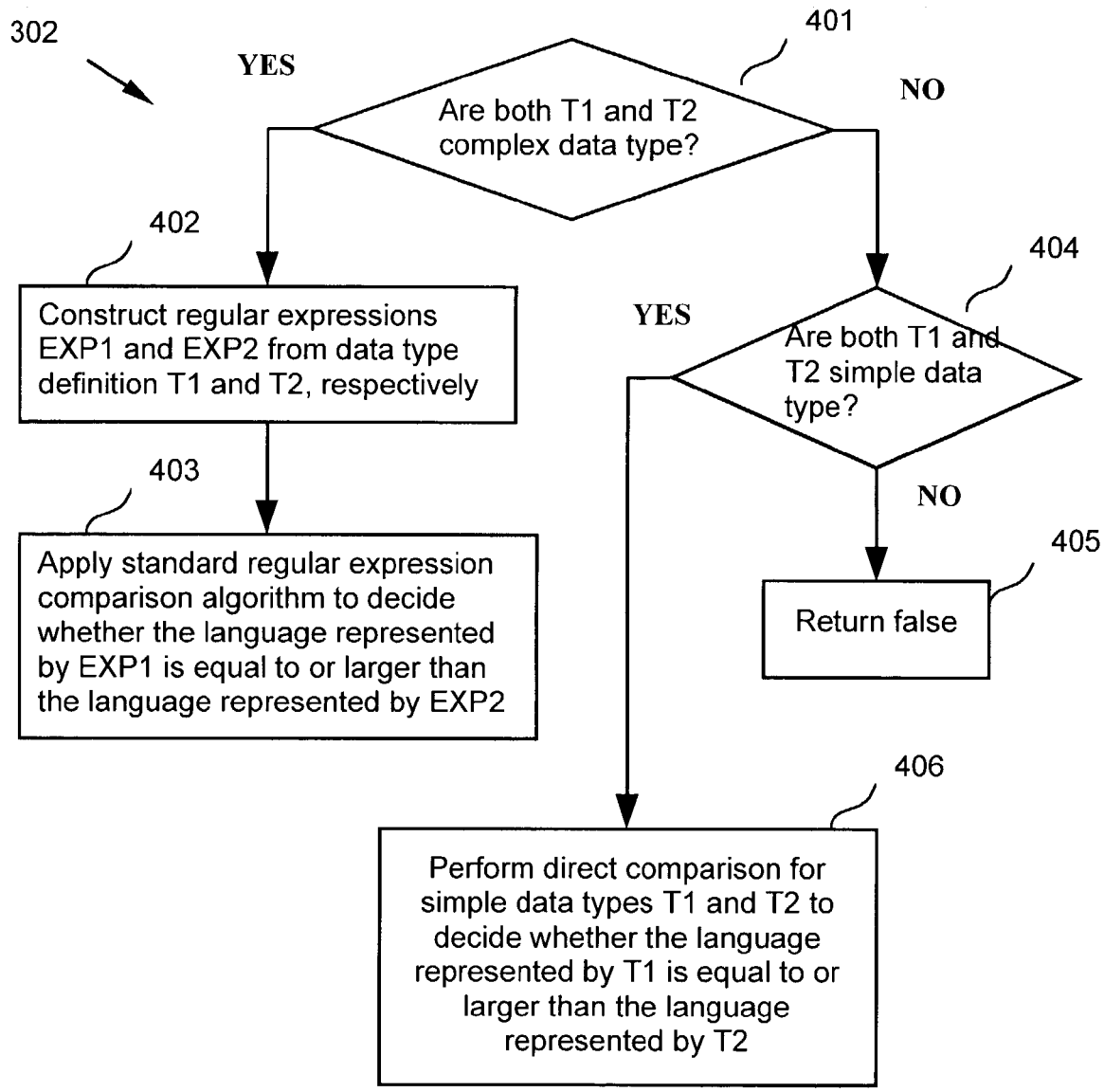
FIG. 4 is a flow diagram illustrating the sub-steps of the comparison step in FIG. 3.

FIG. 4 is a flow diagram illustrating the sub-steps of the language set comparison step 302:

Step 401: Check if the first type definition T1 and the second type definition T2 are both complex data type;

Step 402: Construct a first regular expression EXP1 for the first type definition T1 and a second regular expression EXP2 for the second type definition T2 if both T1 and T2 are complex data types;

Step 403: Apply standard regular expression comparison algorithms to decide whether the language represented by EXP1 is equal to or larger than the language represented by EXP2;

Step 404: Check if the first type definition T1 and the second type definition T2 are both simple data type;

Step 405: Return false if the first type definition T1 and the second type definition T2 are not both simple data type; and Step 406: Perform direct comparison for simple data types T1 and T2 to decide whether the language represented by T1 is equal to or larger than the language represented by T2.

Figure 5:
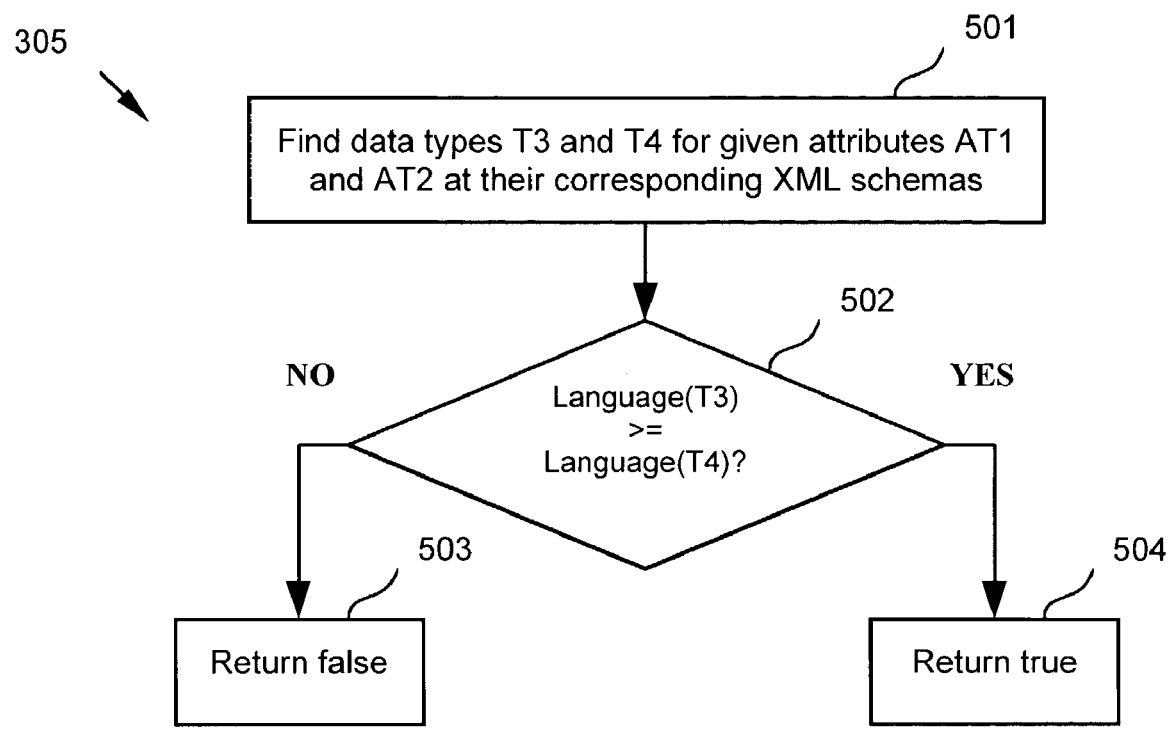
FIG. 5 is a flow diagram illustrating the sub-steps of the comparison step in FIG. 3.

FIG. 5 is a flow diagram illustrating the sub-steps of the attribute comparison step 305:

Step 501: Find a third data type (T3) for a first attribute and a fourth data type (T4) of same attribute in the second XML schema;

Step 502: Perform comparison of a third language set, L(T3), which represents all possible values covered by the third type definition and a fourth language set, L(T4), which represents all possible values covered by the fourth document type;

Step 503: Return false if the third language set L(T3) does not contain the fourth language set L(T4); and Step 504: Return true if the third language set L(T3) contains the fourth language set L(T4).

Another aspect of the invention is a system for evolving XML schemas in an application handling XML documents. The system includes a first sub-system for schema manipulation and a second sub-system for schema validation. The first sub-system for schema manipulation performs a plurality of schema manipulation operations to evolve a current XML schema into a new XML schema. The second sub-system for schema validation validates the new XML schema to make sure all current XML documents are still valid against the new XML schema.

The schema manipulation operations can be any of the following:
 a query schema operation that retrieves a segment of an XML schema;
 an insert schema operation that inserts a segment to an XML schema;
 a replace schema operation that replaces a schema segment of an XML schema;
 a delete schema operation that deletes a schema segment of an XML schema;
 a compact schema operation that eliminates unnecessary segments to make an XML schema compact; and
 an evolve schema operation that commits pending schema changes.

The second sub-system for schema validation may further comprise a comparison module for determining whether a second set containing all valid XML documents of the second XML schema contains a first set containing all valid XML documents of the first XML schema.

In one typical implementation, the application is a Web service that maps data containing in XML documents into a relational database. The system for evolving XML schemas may further comprise a module used to provide gatekeeper control for better data and schema quality, and a module used to trigger underlying database storage change for handling extended data corresponding to the new XML schema.

Although the invention is described herein with reference to the preferred embodiment, one skilled in the art will readily appreciate that other applications may be substituted for those set forth herein without departing from the spirit and scope of the present invention.

Accordingly, the invention should only be limited by the Claims included below.

The invention claimed is:

1. A computer-implemented method for evolving a first XML schema to a second XML schema in application involving a plurality XML documents which are valid against said first XML schema, comprising the steps of:
 performing a plurality of schema manipulation operations to the first XML schema to generate the second XML schema, the schema manipulation operations including operations of the group including: inserting a schema segment, deleting a schema segment, replacing a schema segment;

validating the plurality of schema manipulation operations by performing operations comprising:
  determining whether a second set containing all valid XML documents of said second XML schema contains a first set containing all valid XML documents of said first XML schema.

2. The method of claim 1, wherein said step of schema manipulation operations further comprises the steps of:
  finding an identified node in said first XML schema at a specified location; and
  retrieving a segment of said identified node in said first XML schema.

3. The method of claim 2, wherein said step of schema manipulation operations further comprises the step of:
  inserting a new schema segment into said first XML schema at a relative position of said identified node in said first XML schema.

4. The method of claim 3, wherein said relative position is one of the group containing:
  immediately left sibling, immediately right sibling, first child, and last child of said identified node.

5. The method of claim 2, wherein said step of schema manipulation operations further comprises the step of:
  replacing said identified node in said first XML schema with a new schema segment.

6. The method of claim 2, wherein said step of schema manipulation operations further comprises the step of:
  deleting said identified node from said first XML schema.

7. The method of claim 1, wherein said step of schema manipulation operations further comprise the step of:
  eliminating segments to make said first XML schema compact.

8. The method of claim 1, wherein said step of schema manipulation operations further comprises the step of:
  committing pending schema changes and assigning a new version to said second XML schema.

9. The method of claim 1, wherein the group further includes:
  a query schema operation that retrieves a segment of an XML schema;
  an insert schema operation that inserts a segment to an XML schema;
  a replace schema operation that replaces a schema segment of an XML schema;
  a delete schema operation that deletes a schema segment of an XML schema;
  a compact schema operation that eliminates segments to make an XML schema compact; and
  an evolve schema operation that commits pending schema changes.

10. A computer-implemented method for determining whether a first set of XML documents contains a second set of XML documents, said first set of XML documents being the set of all valid XML documents of a first XML schema and said second set of XML documents being the set of all valid XML documents of a second XML schema, the method comprising the steps of:
  locating a first root element for said first XML schema and a second root element for said second schema;
  removing all elements and attributes from said first XML schemas that are not reachable from said first root element and from said second XML schema that are not reachable from said second root element;
  constructing a first total element list which contains elements in said first XML schema and a second total element list which contains elements in said second schema;
  returning false if said first element list does not contain said second element list; and
  performing element comparison for each of said elements in said second element list with said corresponding elements in said first element list.

11. The method of claim 10, wherein said element comparison step further comprises the steps of:
  finding a first type definition of a first element in said first XML schema and a second type definition of a second element in said second XML schema; and
  performing comparison of a first language set which represents all possible values covered by said first type definition and a second language set which represents all possible values covered by said second type definition; and
  returning false if said first language set does not contain said second language set.

12. The method of claim 11, wherein said element list set comparison step further comprises the steps of:
  checking if said first type definition and said second type definition are both complex data type;
  constructing a first regular expression for said first type definition and a second regular expression for said second type definition if both said first type definition and said second type definition are complex data types;
  applying standard regular expression comparison algorithm to decide whether a first language set represented by said first regular expression is equal to or larger than a second language set represented by said second regular expression;
  checking if said first type definition and said second type definition are both a simple data type;
  returning false if said first type definition and said second type definition are not both simple data types; and
  if both said first type definition and said second type definition are simple data types, performing direct comparison for said first type definition and said second type definition to determine whether said first language set represented by said first type definition is equal to or larger than said second language set represented by said second type definition.

13. The method of claim 10, wherein said element comparison step further comprises the steps of:
  constructing a first attribute set associated with said first element and a second attribute set associated with said second element;
  returning false if said first attribute set does not contain said second attribute set;
  returning false if any attribute in said first attribute set but not in said second attribute set is required; and
  performing attribute comparison for each of said attributes in said second attribute set with said corresponding attributes in said first attribute set.

14. The method claim 13, wherein said attribute comparison step further comprises the steps of:
  finding a third data type of a first attribute and a fourth data type of same attribute in said second XML schema;
  performing comparison of a third language set which represents all possible values covered by said third type definition and a fourth language set, which represents all possible values covered by said fourth document type;
  returning false if said third language set does not contain said fourth language set; and
  returning true if said third language set contains said fourth language set.

15. A digital data processing apparatus for evolving XML schemas in an application handling XML documents, comprising:

schema manipulation means for performing a plurality of schema manipulation operations to the first XML schema to generate the second XML schema, the schema manipulation operations including operations of the group including: inserting a schema segment, deleting a schema segment, replacing a schema segment;

schema validation means for validating the plurality of schema manipulation operations by performing operations comprising:

determining whether a second set containing all valid XML documents of said second XML schema contains a first set containing all valid XML documents of said first XML schema.

16. The apparatus of claim 15, wherein each of said schema manipulation operations is any of:

a query schema operation that retrieves a segment of an XML schema;

an insert schema operation that inserts a segment to an XML schema;

a replace schema operation that replaces a schema segment of an XML schema;

a delete schema operation that deletes a schema segment of an XML schema;

a compact schema operation that eliminates segments to make an XML schema compact; and an evolve schema operation that commits pending schema changes.

17. The apparatus of claim 15, wherein said application is a Web service that maps data contained in XML documents into a relational database.

18. The apparatus of claim 17, further comprising:

means for providing gatekeeper control;

means for triggering underlying database storage change for handling extended data corresponding to said new XML schema.

* * * * *